(12) United States Patent
Gurunathan et al.

(10) Patent No.: US 11,080,663 B2
(45) Date of Patent: Aug. 3, 2021

(54) ELECTRONIC PAYMENT PROCESSING APPARATUS AND METHOD

(71) Applicant: MASTERCARD INTERNATIONAL INCORPORATED, Purchase, NY (US)

(72) Inventors: Arunmurthy Gurunathan, Maharashtra (IN); Navneet Jain, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 257 days.

(21) Appl. No.: 15/976,543

(22) Filed: May 10, 2018

(65) Prior Publication Data

US 2018/0336535 A1 Nov. 22, 2018
US 2020/0175482 A9 Jun. 4, 2020

(30) Foreign Application Priority Data

May 16, 2017 (SG) .......................... 10201704001W (51) Int. Cl.
*G06Q 20/02* (2012.01)
*G06Q 20/12* (2012.01)
(Continued)

(52) U.S. Cl.
CPC ........... *G06Q 20/023* (2013.01); *G06Q 20/02* (2013.01); *G06Q 20/12* (2013.01); *G06Q 20/24* (2013.01);
(Continued)

(58) Field of Classification Search
CPC .... G06Q 20/023; G06Q 20/025; G06Q 20/02; G06Q 20/12; G06Q 20/24; G06Q 20/403
See application file for complete search history.

(56) References Cited

U.S. PATENT DOCUMENTS 7,502,760 B1 * 3/2009 Gupta .................. G06Q 20/367
 705/64
7,689,465 B1 * 3/2010 Shakes ..................... G06K 9/78
 705/27.1

(Continued)

FOREIGN PATENT DOCUMENTS

EP 1533726 A1 5/2005
WO 2016004484 A1 1/2016

OTHER PUBLICATIONS

PCT International Search Report and Written Opinion, Application No. PCT/US2018/028495, dated Jul. 3, 2018, 12 pps.

*Primary Examiner* — Scott C Anderson
(74) *Attorney, Agent, or Firm* — Armstrong Teasdale LLP (57) ABSTRACT

An apparatus for processing electronic payment transactions is provided. The apparatus includes a computer processor and a data storage device, the data storage device having an incoming and an outgoing transaction initiation module including non-transitory instructions operative by the processor to receive an order indication at a payment intermediary server, the order indication indicating an order by a customer having an order value amount, initiate a transaction from an account associated with the customer to an intermediary account for the order value amount, initiate a transaction from the intermediary account to an account associated with the merchant for a first portion of the order value amount, receive an order feedback indication, and initiate a further transaction or further transactions in response to the order feedback indication to transfer the second portion of the order value amount to the account associated with the merchant and/or the account associated with the customer.

17 Claims, 4 Drawing Sheets

(51) Int. Cl.
*G06Q 20/40* (2012.01)
*G06Q 20/24* (2012.01)
(52) U.S. Cl.
CPC ......... *G06Q 20/403* (2013.01); *G06Q 20/407* (2013.01)

(56) References Cited

U.S. PATENT DOCUMENTS

| | | |
|---|---|---|
| 8,458,086 B2 | 6/2013 | Bishop et al. |
| 8,554,660 B2 | 10/2013 | Stroh |
| 8,596,527 B2 | 12/2013 | Bishop et al. |
| 2002/0087413 A1* | 7/2002 | Mahaffy ................. G10L 15/26 705/16 |
| 2004/0064405 A1 | 4/2004 | Weichert et al. |
| 2005/0177437 A1* | 8/2005 | Ferrier ................... G06Q 20/02 705/26.8 |
| 2009/0138398 A1 | 5/2009 | Cole et al. |
| 2012/0265632 A1* | 10/2012 | Patro ...................... G06Q 30/06 705/26.1 |
| 2013/0297510 A1* | 11/2013 | Ducote ................. G06Q 20/02 705/44 |
| 2014/0310183 A1* | 10/2014 | Weber ................... G06Q 20/20 705/71 |
| 2016/0148187 A1* | 5/2016 | Trickel .................. G06Q 20/29 705/40 |
| 2016/0171584 A1* | 6/2016 | Cao ..................... G06Q 30/0641 705/26.62 |
| 2016/0275574 A1* | 9/2016 | Nerkar ............... G06Q 30/0282 |

\* cited by examiner

ELECTRONIC PAYMENT PROCESSING APPARATUS AND METHOD

CROSS REFERENCE TO RELATED APPLICATIONS

This patent application claims priority to Singapore Application No. 10201704001W filed on May 16, 2017, the disclosure of which is incorporated by reference herein in its entirety as part of the present application.

BACKGROUND

The present disclosure relates to electronic payment processing and in particular to processing payments between a customer and a merchant.

In recent years there has been rapid growth in electronic commerce. One great advantage to electronic commerce is that it allows new merchants to offer goods and services without the requirement to establish a physical presence such as a shop. This creates a wide range of choices for consumers; however when a new electronic commerce site opens consumers may be hesitant to use the new site due to concerns about trust for the new site. This problem is not limited to electronic commerce; consumers may also be hesitant to visit a new restaurant, or watch a newly released movie without knowledge of the quality of the goods or service to be purchased.

BRIEF DESCRIPTION

In general terms, the present disclosure provides a payment intermediary that facilitates a part payment to be made in advance for goods and services and a remaining amount to be paid to the merchant once the goods or services have satisfactorily been delivered.

A first aspect of the present disclosure provides an apparatus for processing electronic payment transactions. The apparatus includes a computer processor and a data storage device, the data storage device having an incoming transaction initiation module, and an outgoing transaction initiation module including non-transitory instructions operative by the processor to receive an order indication at a payment intermediary server, the order indication indicating an order by a customer for goods and/or services at a merchant, the order having an order value amount, initiate a transaction from an account associated with the customer to an intermediary account for the order value amount, initiate a transaction from the intermediary account to an account associated with the merchant for a first portion of the order value amount, whereby a second portion of the order value amount remains in the intermediary amount, receive an order feedback indication, and initiate a further transaction or further transactions in response to the order feedback indication to transfer the second portion of the order value amount to the account associated with the merchant and/or the account associated with the customer.

A second aspect of the present disclosure provides an apparatus for processing electronic payment transactions. The apparatus includes a computer processor and a data storage device, the data storage device having an a payment network transaction initiation module including non-transitory instructions operative by the processor to receive an order indication at a payment intermediary server, the order indication indicating an order by a customer for goods and/or services at a merchant, the order having an order value amount, initiate a first transaction from a payment card account associated with the customer to an account associated with the merchant for a first portion of the order value amount, receive an order feedback indication, and initiate a further transaction from the payment card account associated with the customer in response to the order feedback indication to transfer at least part of a second portion of the order value amount to the account associated with the merchant.

In an embodiment the payment network transaction initiation module further includes non-transitory instructions operative by the processor to place a holding transaction on the second portion of the order value amount.

In an embodiment the data storage device further includes a distribution determination module including non-transitory instructions operative by the processor to determine the first portion and the second portion of the order value amount.

In an embodiment the distribution determination module includes non-transitory instructions operative by the processor to determine the first portion and the second portion of the order value amount based on a predefined ratio.

In an embodiment the distribution determination module includes non-transitory instructions operative by the processor to determine an allocation of the second portion between the merchant and the customer.

In an embodiment the distribution determination module includes non-transitory instructions operative by the processor to allocate the second portion to the merchant responsive to the order feedback indication indicating that the customer is satisfied with the order.

In an embodiment the distribution determination module includes non-transitory instructions operative by the processor to allocate at least a portion of the second portion to the customer based on a review or rating of the goods and/or services.

In an embodiment the order feedback indication includes an image corresponding to the goods and/or services.

A third aspect of the present disclosure provides an electronic payment method. The electronic payment method includes receiving an order indication at a payment intermediary server, the order indication indicating an order by a customer for goods and/or services at a merchant, the order having an order value amount, initiating a transaction from an account associated with the customer to an intermediary account for the order value amount, initiating a transaction from the intermediary account to an account associated with the merchant for a first portion of the order value amount, whereby a second portion of the order value amount remains in the intermediary amount, receiving an order feedback indication, and initiating a further transaction or further transactions in response to the order feedback indication to transfer the second portion of the order value amount to the account associated with the merchant and/or the account associated with the customer.

A fourth aspect of the present disclosure provides an electronic payment method. The electronic payment method includes receiving an order indication at a payment intermediary server, the order indication indicating an order by a customer for goods and/or services at a merchant, the order having an order value amount, initiating a first transaction from a payment card account associated with the customer to an account associated with the merchant for a first portion of the order value amount, receiving an order feedback indication, and initiating a further transaction from the payment card account associated with the customer in response to the order feedback indication to transfer at least part of a second portion of the order value amount to the account associated with the merchant.

A further aspect of the present disclosure provides a non-transitory computer-readable medium. The computer-readable medium has stored thereon program instructions for causing at least one processor to perform operations of a method disclosed above.

BRIEF DESCRIPTION OF THE DRAWINGS

Embodiments of the disclosure will now be described for the sake of non-limiting example only, with reference to the following drawings in which.

DETAILED DESCRIPTION

Figure 1:
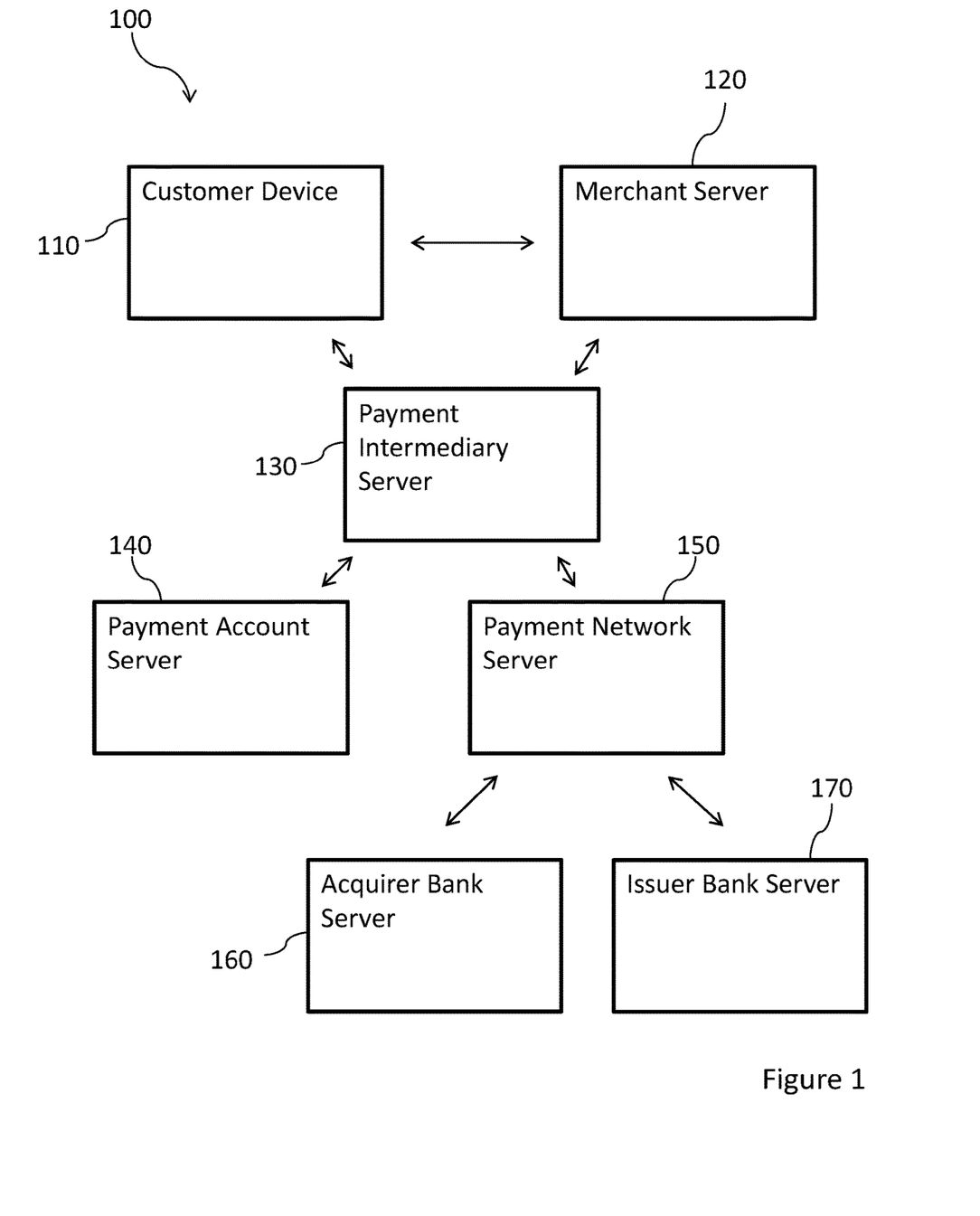
FIG. 1 is a block diagram showing a system for processing electronic payments between a customer and a merchant according to an embodiment of the present disclosure.

FIG. 1 is a block diagram showing a system for processing electronic payment transactions between a customer and a merchant according to an embodiment of the present disclosure. The system 100 includes a customer device 110 and merchant server 120. The customer device 110 is associated with a customer and may be for example, a smart phone device, a tablet computer device, or a personal computer device. The merchant server 120 is associated with a merchant. The customer device 110 and the merchant server 120 are both coupled to a payment intermediary server 130. The payment intermediary server 130 facilitates electronic payment transactions between the customer and the merchant. During a payment transaction facilitated by the payment intermediary server 130, a payment for goods and/or services is taken from an account associated with the customer, and a part payment is made to the merchant. The remainder of the payment is made to the merchant when the customer has indicated that they are satisfied with the delivered goods and/or services.

As shown in FIG. 1, the payment intermediary server 130 is coupled to a payment account server 140 and a payment network server 150. In some embodiments of the present disclosure the payments may only be implemented on the payment account server 140 or the payment network server 150. The payment account server 140 may be implemented as an ACH (Automated Clearing House) processing server.

The payment network server 150 is a server associated with a payment network such as the Banknet payment network operated by MasterCard. As shown in FIG. 1 the payment network server 150 is coupled to an acquirer bank server 160 and an issuer bank server 170. The acquirer bank server 160 is a server associated with a bank with which the merchant holds an account and the issuer bank server 170 is a server associated with a bank that has issued a payment card to the customer. Communication between the servers may take place via any type of network, for example, a virtual private network (VPN), the Internet, a local area and/or wide area network (LAN and/or WAN), and so on.

As used in this document, the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. Furthermore, the "payment card" may exist only as a data structure (i.e. without physical existence), which is registered with a digital wallet or cloud wallet.

Figure 2:
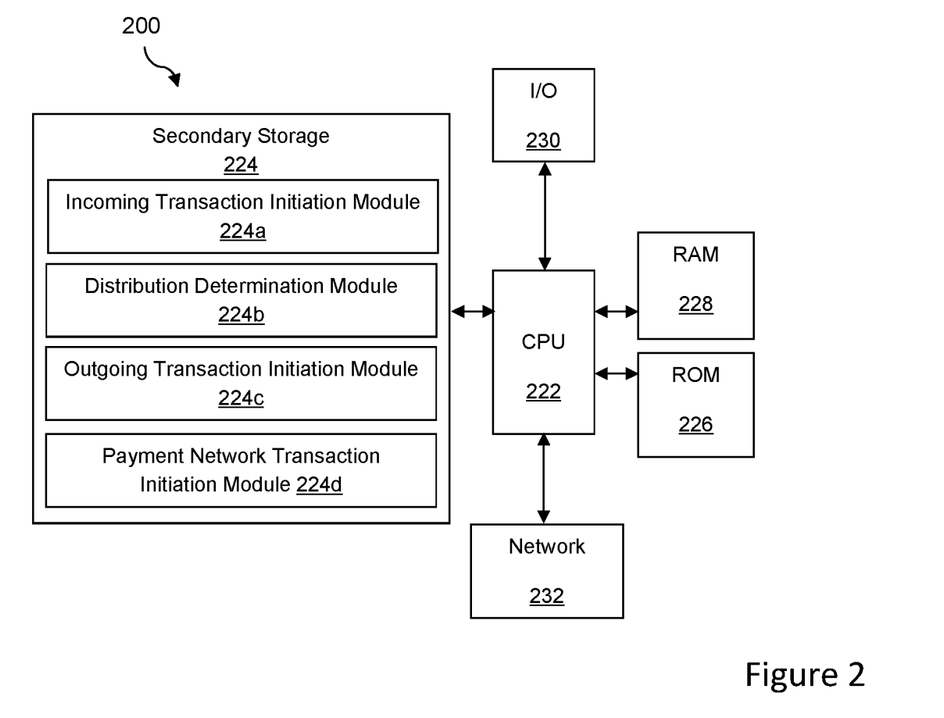
FIG. 2 is a block diagram illustrating a technical architecture of a payment intermediary server according to an embodiment of the present disclosure.

FIG. 2 is a block diagram showing a technical architecture 200 of the payment intermediary server 130 for performing steps of exemplary methods 300 and 400, which are described below with reference to FIGS. 3 and 4. Typically, the methods 300 and 400 are implemented by a number of computers each having a data-processing unit. The block diagram as shown in FIG. 2 illustrates a technical architecture 200 of a computer which is suitable for implementing one or more embodiments herein.

The technical architecture 200 includes a processor 222 (which may be referred to as a central processor unit or CPU) that is in communication with memory devices including secondary storage 224 (such as disk drives), read only memory (ROM) 226, and random access memory (RAM) 228. The processor 222 may be implemented as one or more CPU chips. The technical architecture 200 may further include input/output (I/O) devices 230, and network connectivity devices 232.

The secondary storage 224 typically includes one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. In this embodiment, the secondary storage 224 has an incoming transaction initiation module 224a, a distribution determination module 224b, an outgoing transaction initiation module 224c, and a payment network transaction initiation module 224d including non-transitory instructions operative by the processor 222 to perform various operations of the method of the present disclosure. As depicted in FIG. 2, the modules 224a-224d are distinct modules which perform respective functions implemented by the payment intermediary server 130. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 224a-224d is described herein, these may alternatively be implemented as one or more hardware modules (such as field-programmable gate array(s) or application-specific integrated circuit(s)) including circuitry which implements equivalent functionality to that implemented in software. The ROM 226 is used to store instructions and perhaps data which are read during program execution. The secondary storage 224, the RAM 228, and/or the ROM 226 may be referred to in some contexts as computer readable storage media and/or non-transitory computer readable media.

The I/O devices may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 200, at least one of the CPU 222, the RAM 228, and the ROM 226 are changed, transforming the technical architecture 200 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 200 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 200 to provide the functionality of a number of servers that is not directly bound to the number of computers in the technical architecture 200. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

Various operations of an exemplary method 300 will now be described with reference to FIG. 3 in respect of providing performing a transaction between a customer and a merchant. It should be noted that enumeration of operations is for purposes of clarity and that the operations need not be performed in the order implied by the enumeration.

Figure 3:
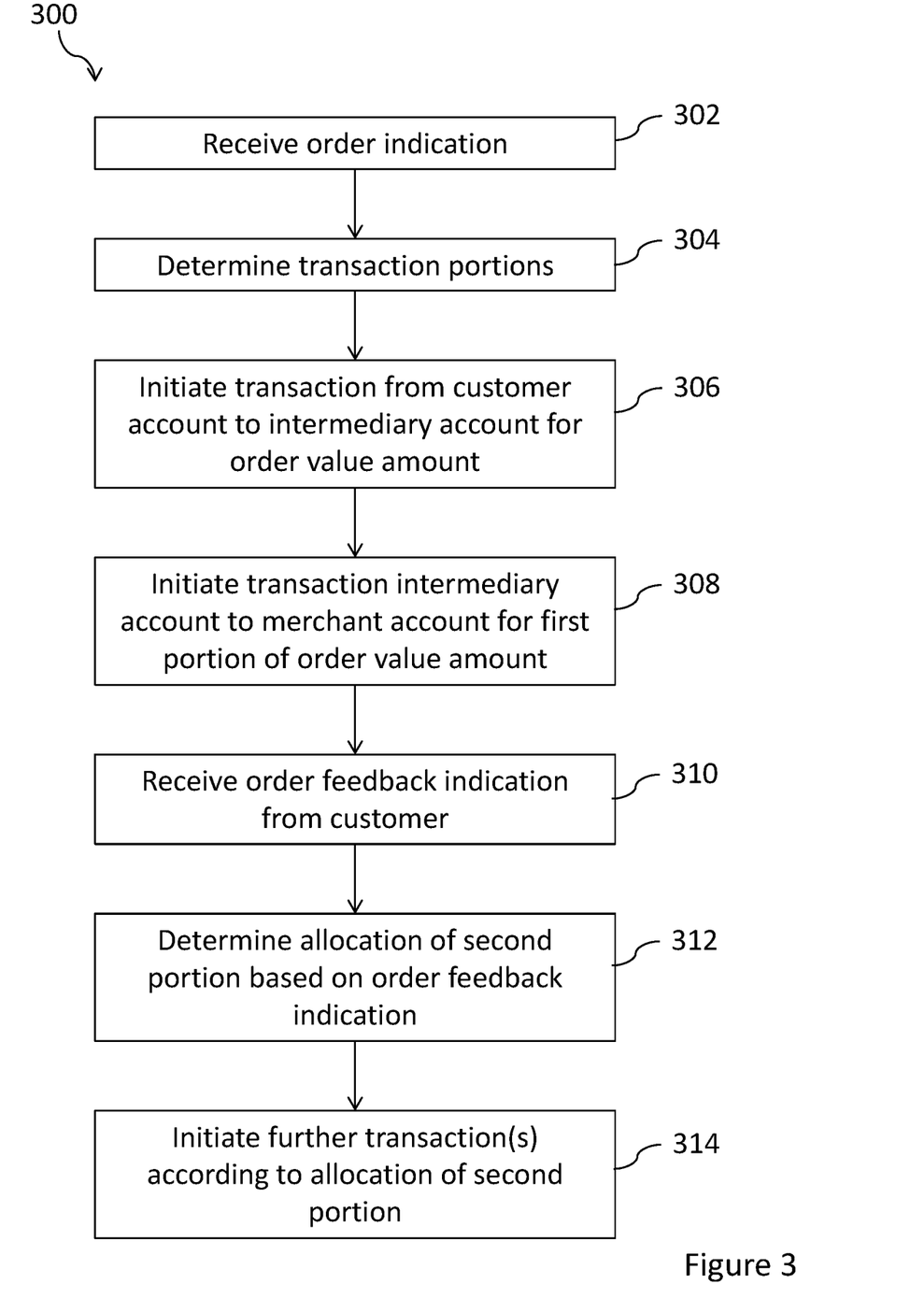
FIG. 3 shows a method of processing an electronic payment according to an embodiment of the present disclosure.

FIG. 3 is a flow chart showing a method of processing an electronic payment according to an embodiment of the present disclosure.

In step 302, payment intermediary server 130 receives an order indication from merchant server 120. The order indication may be an indication of an order received from the customer device 110. This order may, for example be an electronic commerce order at an online shop implemented by the merchant server 120. Alternatively, the order indication may relate to an order made by a customer at a so-called "bricks and mortar" merchant such as a restaurant or a cinema. The order indication includes an indication of a total order value amount which indicates the total value of the order.

In step 304, the distribution determination module 224b of the payment intermediary server 130 determines transaction portions based on the total order value amount. The transaction portions are an amount to be provided to the merchant immediately and an amount to be held by the payment intermediary server 130 until the goods and/or services relating to the order have been satisfactorily delivered.

The split of the transaction portions may be determined from a ratio agreed with the merchant during an initiation procedure. This split may be stored in a storage device on the payment intermediary server 130 or a storage device coupled to and accessible by the payment intermediary server 130. The split of transaction portions may for example be 50%-50%, that is 50% of the total order value amount transferred to the merchant initially and 50% held by the payment intermediary server 130, or 20%-80%, that is initially 20% transferred to the merchant and 80% held by the payment intermediary server 130.

In step 306, the incoming payment initiation module 224a of the payment intermediary server 130 initiates a payment from an account associated with the customer to an intermediary account for the total order value amount. In this embodiment, the payment intermediary server 130 communicates with the payment account server 140 to initiate transactions between accounts associated with the customer and the merchant and also an account associated with the payment intermediary.

In step 308, the outgoing transaction initiation module 224c of the payment intermediary server 130 initiates a transaction from the account associated with the payment intermediary to an account associated with the merchant for an initial portion of the total order value amount. As described above, the initial portion of the total order value amount may be, for example, 20% or 50% of the total order value amount.

The initial portion of the total order value amount serves as a deposit or initial payment made to the merchant. Once the merchant receives this initial payment, goods and/or services corresponding to the order are delivered. It noted here that while the merchant receives the initial portion of the total order value amount in step 308, the remainder of the total order value amount is held by the payment intermediary, thus the merchant has an assurance that this amount will be paid if the order is satisfactorily delivered.

Once the order is delivered, the customer is prompted to provide an order feedback indication.

In step 310, the payment intermediary server 130 receives an order feedback indication from the customer device 110. The order feedback indication may include an indication that the customer is satisfied with the order. The order feedback indication may include an indication that the customer is not satisfied with the order. When the order feedback indication includes an indication that the customer is not satisfied with the order, the order feedback indication may include an additional indication of the reasons why the customer is not satisfied with the order. The order feedback indication may include an image captured by the customer of goods delivered as the order.

The order feedback indication may include a reference to online reviews of the product and/or service purchased as the order. For example where the order relates to a movie or theatre ticket, the order feedback indication may relate to reviews or ratings of the movie or play at the theatre.

The order feedback indication may include an indication of the timeliness of delivery of a package ordered from an online shop, an indication of the quality of the package, an indication of the quality of the product as per the image in the site and review.

In step 312, the distribution determination module 224b of the payment intermediary server 130 determines the allocation of the second, remaining portion of the total order value amount based on the order feedback indication.

If the order feedback indication received from the customer device 110 indicates that the customer was satisfied with the delivery of the order, then the second portion of the total order value amount is allocated to the merchant.

However, if the order feedback indication received from the customer device 110 indicates that the customer was not satisfied with the delivery of the order, then the allocation of the second portion of the total order value amount between the customer and the merchant is determined by the distribution determination module 224b of the payment intermediary server 130.

The allocation of the second portion of the total order value amount by the distribution determination module 224b of the payment intermediary server 130 may be determined based on predetermined factors, for example, if the review ratings of the product or service are below a pre-specified threshold or within a pre-specified range, then the second portion of the total order value amount may be distributed in a pre-specified manner. For example, if the order relates to a newly released movie, the distribution of the second portion may be determined based on an average review rating received by the movie. In this example, if the movie is rated with 4 or 5 stars, then the full amount may be allocated to the merchant, if the movie is rated 3 stars then the customer may receive a refund of 10% and the remainder of the second portion is allocated to the merchant, if the movie is rated less than 2 stars, then the customer may receive a refund of 30% and the remainder is allocated to the merchant.

In some embodiments, the customer may be given an option to receive a partial refund. For example, where a product is ordered and receives poor reviews or a product is received not as described, the customer may be given the option to receive a partial refund from the second portion of the total order value amount instead of returning the product. In such embodiments, the customer may be prompted with options via the customer device 110 and the customer may input their decision which would be received by the distribution determination module 224b of the payment intermediary server 130.

In step 314, the outgoing transaction payment initiation module 224c of the payment intermediary server 130 initiates a further transaction or further transactions according to the allocation of the second portion of the total order value amount.

If in step 312, the second portion of the total order value amount was allocated to the merchant, then in step 314, the outgoing transaction payment initiation module 224c initiates a transaction which transfers the full amount of the second portion of the total order value amount from the account associated with the intermediary to an account associated with the merchant.

When in step 312 it was determined that the second portion of the total order value amount should be split between the merchant and the customer, then in step 314, the outgoing transaction initiation module 224c initiates two transactions from the account associated with the intermediary: one to an account associated with the customer and one to the account associated with the merchant.

If in step 312 it was determined that the second portion of the total order value amount should be returned to the customer, then in step 314, the outgoing transaction initiation module 224c initiates a transaction from the account associated with the intermediary to the account associated with the customer for the second portion of the total order value amount.

In the method described above with reference to FIG. 3, the payment intermediary server 130 communicates with the payment account server 140 to initiate transfers between accounts associated with the customer, the merchant and the payment intermediary.

Further embodiments are envisaged in which payments are made by a payment card such as a credit or debit card. An example of such an embodiment is described below with reference to FIG. 4.

Various operations of an exemplary method 400 will now be described with reference to FIG. 4 in respect of providing performing a transaction between a customer and a merchant. It should be noted that enumeration of operations is for purposes of clarity and that the operations need not be performed in the order implied by the enumeration.

Figure 4:
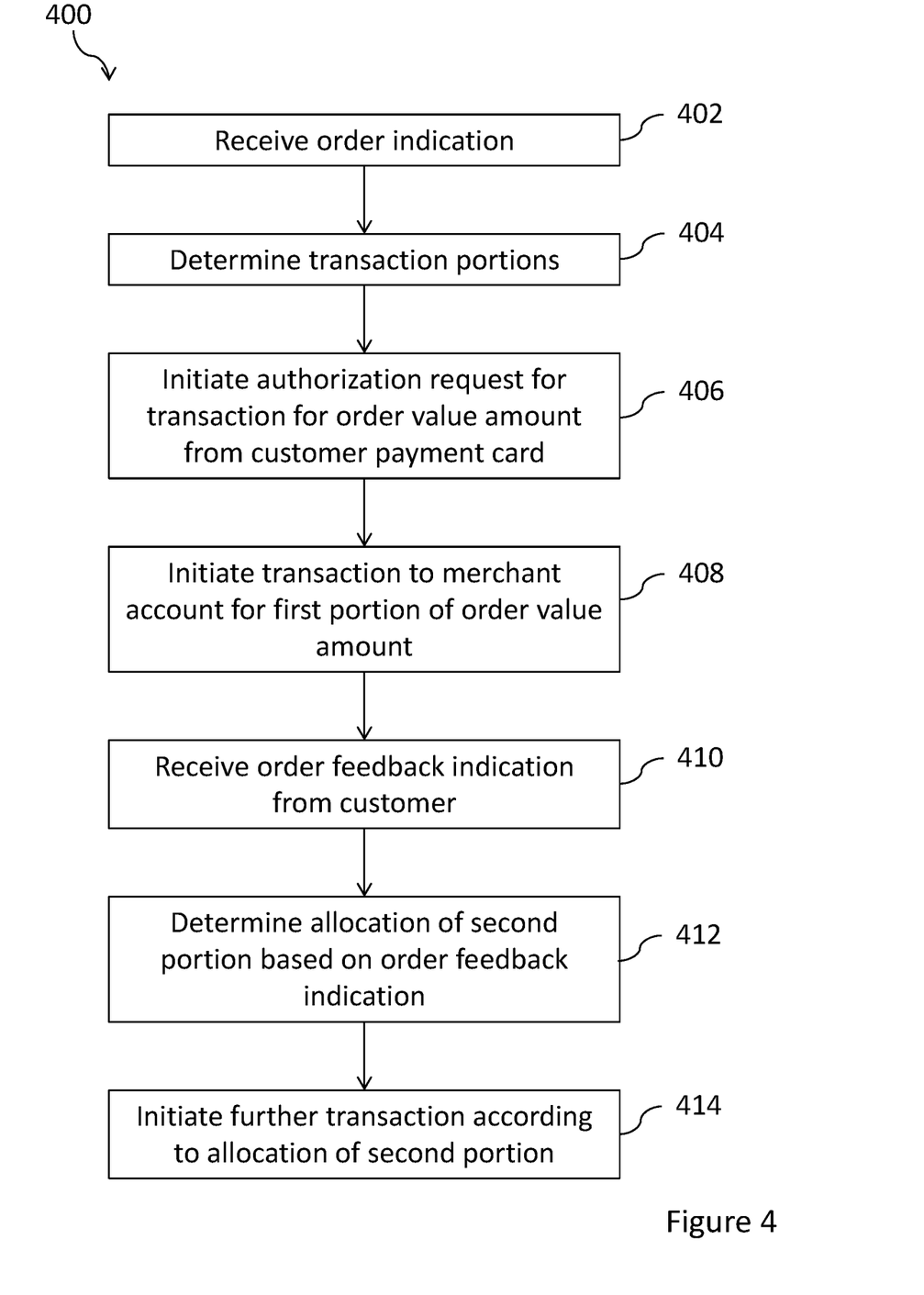
FIG. 4 shows a method of processing an electronic payment from a payment card account associated with a customer according to an embodiment of the present disclosure.

FIG. 4 is a flow chart showing a method of processing an electronic payment from a payment card account associated with a customer according to an embodiment of the present disclosure.

Steps 402 and 404 of the method 400 correspond to steps 302 and 304 of the method 300 which are described above in relation to FIG. 3.

In step 402 the payment intermediary server 130 receives an order indication from the merchant server 120 and in step 404, the distribution determination module 224b of the payment intermediary server 130 determines transaction portions based on the total order value amount. The transaction portions are an amount to be provided to the merchant immediately and an amount to be held until the goods and/or services relating to the order have been satisfactorily delivered.

In this embodiment, the order indication includes an indication of a payment card associated with the customer in addition to an indication of the total order value amount for the order.

In step 406, the payment network transaction initiation module 224d of the payment intermediary server 130 initiates a transaction authorization request for the order value amount from the payment card account associated with the customer. The transaction authorization request is routed over a payment network by the payment network server 150.

The payment network server 150 routes the transaction authorization request to an issuer bank server 170 associated with the payment card account.

In step 408, the payment network transaction initiation module 224d of the payment intermediary server 130 initiates a transaction to an account associated with the merchant for the first portion of the total order value amount.

The transaction initiation request is routed over the payment network by the payment network server 150. In response to the transaction initiation requests, the issuer bank server 170 transfers the first portion of the total order value amount to an account associated with the merchant on the acquirer bank server 160. A further blocking transaction is placed on the second remaining portion of the total order amount by the issuer bank server 170.

Following step 408 a notification may be sent to the customer device 110 by the issuer bank server 170 or the payment intermediary server 130 indicting that a blocking transaction has been placed on the second portion of the total order value amount.

It is noted that in this embodiment, the merchant receives the initial portion of the total order value amount and the second remaining portion of the total order value amount remains in the payment card account associated with the customer, with a block placed upon it until the method 400 is completed.

Following step 408, the merchant delivers or fulfills the order. Once the order is delivered, the customer is prompted to provide an order feedback indication.

In step 410, the payment intermediary server 130 receives an order feedback indication from the customer device 110. The order feedback indication received in step 410 is as described above in relation to step 310 of the method 300.

In step 412, the distribution determination module 224b of the payment intermediary server 130 determines the allocation of the second portion of the total order value amount based on the order feedback indication. Step 412 is performed in the same manner as step 312 of method 300 described above in relation to FIG. 3.

In step 414, the payment network transaction initiation module 224d of the payment intermediary server 130 initiates a further transaction according to the allocation of the second portion of the total order value amount.

If in step 412, the second portion of the total order value amount was allocated to the merchant, then in step 414, the payment network transaction initiation module 224d initiates a second payment network transaction via the payment network server 150 transaction which transfers the full amount of the second portion of the total order value amount from the payment card account associated with the customer to the account associated with the merchant at the acquirer bank.

When in step 412 it was determined that the second portion of the total order value amount should be split between the merchant and the customer, then in step 414, the payment network transaction initiation module 224d initiates a transaction which transfers the a part of the second portion of the total order value amount from the payment card account associated with the customer to the account associated with the merchant at the acquirer bank and also causes the issuer bank server 170 to remove the blocking transaction on the remaining portion of the total order value amount.

If in step 412 it was determined that the second portion of the total order value amount should remain with the customer, then in step 414, the payment network transaction initiation module 224d causes the issuer bank server 170 to remove the blocking transaction on the second portion of the total order value.

In step 414, the issuer bank server 170 may send a notification to the customer device indicating the actions taken based on the results of the determination in step 412.

Whilst the foregoing description has described exemplary embodiments, it will be understood by those skilled in the art that many variations of the embodiment can be made within the scope and spirit of the present disclosure.

What is claimed is:

1. An apparatus for processing electronic payment transactions, the apparatus comprising:
   a computer processor and a data storage device, the computer processor interposed between i) a merchant server associated with an electronic commerce site of a merchant and ii) a payment account server configured to route transaction requests over at least one of an automated clearing house (ACH) network and a payment card processing network, the data storage device comprising non-transitory instructions executable by the computer processor to:
   receive, via the Internet from the merchant server, an order indication at a payment intermediary server, the order indication indicating an order by a customer for a product offered on the electronic commerce site, the electronic commerce site providing a description of the product, the order having an order value amount;
   initiate, by an incoming payment initiation module programmed to transmit instructions to the payment account server that cause routing of transactions over the at least one of the ACH network and the payment card processing network, a first transaction from an account associated with the customer to an intermediary account for the order value amount;
   initiate, by an outgoing payment initiation module programmed to transmit instructions to the payment account server that cause routing of transactions over the at least one of the ACH network and the payment card processing network, a second transaction from the intermediary account to an account associated with the merchant for a first portion of the order value amount, whereby a second portion of the order value amount remains in the intermediary account;
   in response to a delivery of the product to the customer, cause a customer device associated with the customer to display a prompt for the customer to input an order feedback indication via the customer device, the order feedback indication including an indication of the quality of the product;
   receive the order feedback indication from the customer device via the Internet, the order feedback indication including an image captured by the customer of the delivered product and indicating that the delivered product is not as described on the electronic commerce site as per the image;
   in response to the order feedback indication, cause the customer device associated with the customer to display a prompt presenting a refund option for the customer to receive a partial refund amount from the second portion in lieu of a product return;
   receive, from the customer device via the Internet, an indication of a selection of the refund option;

initiate, by the outgoing payment initiation module in response to the selection of the refund option, a third transaction from the intermediary account to the account associated with the customer for the partial refund amount; and initiate, by the outgoing payment initiation module in response to the selection of the refund option, a fourth transaction of a remainder of the second portion of the order value amount to the account associated with the merchant.

2. An apparatus according to claim 1, wherein the data storage device further comprises a distribution determination module comprising non-transitory instructions executable by the computer processor to determine the first portion and the second portion of the order value amount.

3. An apparatus according to claim 2, wherein the distribution determination module comprises non-transitory instructions executable by the computer processor to determine the first portion and the second portion of the order value amount based on a predefined ratio.

4. An apparatus for processing electronic payment transactions, the apparatus comprising:

a computer processor and a data storage device, the computer processor interposed between i) a merchant server associated with an electronic commerce site of a merchant and ii) a payment account server configured to route transaction requests over one of an automated clearing house (ACH) network and a payment card processing network, the data storage device comprising non-transitory instructions executable by the computer processor to:

receive, via the Internet from the merchant server, an order indication at a payment intermediary server, the order indication indicating an order by a customer for a product offered on the electronic commerce site, the electronic commerce site providing a description of the product, the order having an order value amount;

initiate, by an incoming payment initiation module programmed to transmit instructions to the payment account server that cause routing of transactions over the at least one of the ACH network and the payment card processing network, a first transaction from a payment card account associated with the customer to an account associated with the merchant for a first portion of the order value amount;

in response to a delivery of the product to the customer, cause a customer device associated with the customer to display a prompt for the customer to input an order feedback indication via the customer device, the order feedback indication including an indication of the quality of the product;

receive the order feedback indication from the customer device via the Internet, the order feedback indication including an image captured by the customer of the delivered product and indicating that the delivered product is not as described on the electronic commerce site as per the image;

in response to the order feedback indication, cause the customer device associated with the customer to display a prompt presenting a refund option for the customer to receive a partial refund amount from a second portion in lieu of a product return;

receive, from the customer device via the Internet, an indication of a selection of the refund option;

initiate, by an outgoing payment initiation module programmed to transmit instructions to the payment account server that cause routing of transactions over the at least one of the ACH network and the payment card processing network in response to the selection of the refund option, a second transaction from the account associated with the merchant to the account associated with the customer for the partial refund amount; and initiate, by the outgoing payment initiation module in response to the selection of the refund option, a third transaction from the payment card account associated with the customer of a remainder of the second portion of the order value amount to the account associated with the merchant.

5. An apparatus according to claim 4, wherein the data storage device further comprises non-transitory instructions executable by the computer processor to place a holding transaction on the second portion of the order value amount.

6. An apparatus according to claim 4, wherein the data storage device further comprises a distribution determination module comprising non-transitory instructions executable by the computer processor to determine the first portion and the second portion of the order value amount.

7. An apparatus according to claim 6, wherein the distribution determination module comprises non-transitory instructions executable by the computer processor to determine the first portion and the second portion of the order value amount based on a predefined ratio.

8. An apparatus according claim 6, wherein the distribution determination module comprises non-transitory instructions executable by the computer processor to determine an allocation of the second portion between the merchant and the customer.

9. An apparatus according to claim 8, wherein the distribution determination module comprises non-transitory instructions executable by the computer processor to allocate the entire second portion to the merchant responsive to the order feedback indication indicating that the customer is satisfied with the order.

10. An apparatus according to claim 8 wherein the distribution determination module comprises non-transitory instructions executable by the computer processor to allocate at least a portion of the second portion to the customer based on a review or rating of the product.

11. An electronic payment method performed by an apparatus including a computer processor and a data storage device, the computer processor interposed between i) a merchant server associated with an electronic commerce site of a merchant and ii) a payment account server configured to route transaction requests over one of an automated clearing house (ACH) network and a payment card processing network, the method comprising:

receiving, by the apparatus, via the Internet from the merchant server, an order indication at a payment intermediary server, the order indication indicating an order by a customer for a product offered on the electronic commerce site, the electronic commerce site providing a description of the product, the order having an order value amount;

initiating, by the apparatus, by an incoming payment initiation module programmed to transmit instructions to the payment account server that cause routing of transactions over the at least one of the ACH network and the payment card processing network, a first transaction from a payment card account associated with the customer to an account associated with the merchant for a first portion of the order value amount;

causing, by the apparatus in response to a delivery of the product to the customer, a customer device associated with the customer to display a prompt for the customer to input an order feedback indication via the customer device, the order feedback indication including an indication of the quality of the product;

receiving, by the apparatus the order feedback indication from the customer device via the Internet, the order feedback indication including an image captured by the customer of the delivered product and indicating that the delivered product is not as described on the electronic commerce site as per the image;

in response to the order feedback indication, causing, by the apparatus, the customer device associated with the customer to display a prompt presenting a refund option for the customer to receive a partial refund amount from the second portion in lieu of a product return;

receiving, by the apparatus, from the customer device via the Internet, an indication of a selection of the refund option;

initiating, by the apparatus, by an outgoing payment initiation module programmed to transmit instructions to the payment account server that cause routing of transactions over the at least one of the ACH network and the payment card processing network in response to the selection of the refund option, a second transaction from the account associated with the merchant to the account associated with the customer for the partial refund amount; and initiating, by the apparatus, by the outgoing payment initiation module in response to the selection of the refund option, a third transaction from the payment card account associated with the customer of a remainder of the second portion of the order value amount to the account associated with the merchant.

12. A method according to claim 11, further comprising placing, by the apparatus, a holding transaction on the second portion of the order value amount.

13. A method according to claim 11, further comprising determining, by the apparatus, the first portion and the second portion of the order value amount.

14. A method according to claim 13, wherein the first portion and the second portion of the order value amount are determined based on a predefined ratio.

15. A method according to claim 11, comprising allocating, by the apparatus, the entire second portion to the merchant responsive to the order feedback indication indicating that the customer is satisfied with the order.

16. A method according to claim 11, comprising allocating, by the apparatus, at least a portion of the second portion to the customer based on a review or rating of the product.

17. A non-transitory computer readable medium carrying computer executable instructions which, when executed on a computer processor, cause the computer processor to carry out a method according to claim 11.

* * * * *